United States Patent [19]

Sakuma et al.

[11] Patent Number: 5,417,084
[45] Date of Patent: May 23, 1995

[54] VACUUM CONCENTRATING PLANT

[75] Inventors: Ken Sakuma, No. 793, Hachigasaki, Matsudo-shi, Chiba-ken; Masaki Sakuma, Matsudo; Kenji Sakuma, Matsudo; Kiyoto Tsuruta, Omiya, all of Japan

[73] Assignee: Ken Sakuma, Chiba, Japan

[21] Appl. No.: 261,143

[22] Filed: Jun. 14, 1994

[30] Foreign Application Priority Data

Jun. 29, 1993 [JP] Japan .................. 5-182142

[51] Int. Cl.⁶ .................. B01D 1/00; C02F 1/22
[52] U.S. Cl. .................. 62/532; 62/324.3
[58] Field of Search .................. 62/123, 124, 324.3, 62/532, 533, 537, 544; 426/384

[56] References Cited

U.S. PATENT DOCUMENTS

| | | | |
|---|---|---|---|
| 3,376,652 | 4/1968 | Hernandez, Jr. | 62/324.3 X |
| 3,494,139 | 2/1970 | Shapiro et al. | 62/544 X |
| 3,501,924 | 3/1970 | Ashley | 62/537 X |
| 3,574,950 | 4/1971 | Dantoni | 62/324.3 X |
| 3,820,349 | 6/1974 | Styron et al. | 62/324.3 X |
| 4,016,657 | 4/1977 | Passey | 62/324.3 X |
| 4,973,387 | 11/1990 | Osterman et al. | 62/324.3 X |
| 5,137,739 | 8/1992 | Roodenrijs | 62/532 X |

FOREIGN PATENT DOCUMENTS 557101 3/1993 Japan .

Primary Examiner—Christopher Kilner
Attorney, Agent, or Firm—Browdy and Neimark

[57] ABSTRACT

In a vacuum concentrating plant, a feed liquid supplied into a vacuum pan evaporator is heated indirectly by a latent heat by introducing depressurized vapor into a steam jacket added to an outer periphery of a lower portion of the vacuum pan evaporator. In this manner, the feed liquid in the vacuum pan evaporator is boiled and concentrated in a concentrating zone within the vacuum evaporator. The depressurized vapor used for heating the feed liquid is obtained by heating water in a depressurized vapor generator by means of a heating source in a heat pump. On the other hand, the vapor generated in the vacuum evaporator is cooled and condensed in a vapor condenser by means of a cooling source in the heat pump and removed in the form of a drain outside a circuit system. A concentrate as a product is withdrawn outside the circuit system through a concentrate withdrawing line by an operation of a pump. Thus, in this vacuum concentrating plant, it is possible to provide a high heat efficiency, an excellent stability of the operation and a low running cost by a combination of the vacuum pan evaporator, the depressurized vapor generator and the heat pump. Further, it is possible to concentrate the feed liquid at a low temperature of 60° C. or less.

3 Claims, 2 Drawing Sheets

VACUUM CONCENTRATING PLANT

BACKGROUND OF THE INVENTION

1. Field of the Invention

The present invention relates to a vacuum concentrating plant for concentrating a feed liquid at a relatively low temperature by a heating evaporation thereof, which is used to concentrate, for example, a fruit juice, an enzyme, a naturally occurring coloring matter, an yeast extract, a protein solution, an organic acid, a naturally occurring flavoring matter, nucleic acid, medicines or the like, or to concentrate a solution having a low boiling point to recover a solvent therefrom, and particularly, to such a vacuum concentrating plant in which an extremely high heat efficiency can be achieved by combination with a heat pump.

2. Description of the Prior Art

There is a conventionally known and used plant for concentrating the feed liquid at a relatively low temperature, which utilizes a heating by warm water. However, the concentrating plant utilizing the heating by warm water suffers from a disadvantage that the time of start-up of the plant is longer, and a longer time is required for changing the set temperature, because saturated steam is usually used as a heating source. In order to reduce the startup time, a vacuum concentrating plant utilizing a heating by depressurized vapor has been developed. This plant is designed to generate saturated steam under a reduced pressure of 150 to 1,100 Torrs to indirectly heat a feed liquid by a latent heat of this steam.

In the above prior art vacuum concentrating plant, the start-up time thereof is shorter, and the set temperature is easy to change. Moreover, the temperature cannot be abnormally risen, leading to a high stability. However, the above prior art plant suffers from many disadvantages. For example, because steam is drawn by using a vacuum pump or an ejector, a large loss of steam is brought out, and because of a large number of components for a circuit system, a great deal of labor is required for maintenance. Further, it is difficult to set the vapor pressure at 150 Torrs or more and hence, the temperature of heating steam cannot be brought into 60° C. or less. Therefore, the above prior art plant cannot be used for heating and concentrating a feed liquid such as a fruit juice, an enzyme, a naturally occurring coloring matter, an yeast extract, a protein solution, an organic acid, a naturally occurring flavoring matter, nucleic acid, medicines or the like, which are sensitive to a heat, and the above prior art plant exhibits a relatively rough accuracy of adjustment of the set temperature in a range of ±1° to 3° C.

In order to overcome these disadvantages, a vacuum concentrating plant has been proposed, which comprises a combination of a heat pump and a vacuum evaporator and is usable at a heating temperature of 60° C. or less. This plant has been developed to evaporate and concentrate a liquid waste resulting from treatments for photography, as described in Japanese Patent application Laid-open No. 57101/93. In this vacuum concentrating plant, a coiled condenser of a heat pump is disposed in a concentrator maintained under a reduced pressure by an operation of an ejector, so that the liquid waste is heated under the reduced pressure, and evaporated water is cooled and condensed by a coiled evaporator of the heat pump in a cooling chamber provided around the concentrator and then removed as a drain outside a circuit system.

In the known vacuum concentrating plant described in Japanese Patent Application Laid-open No. 57101/93, however, because the coiled condenser of the heat pump serving as a heating source is disposed in the vacuum concentrator to directly heat the liquid waste, a following disadvantage is encountered: Particularly, when a feed liquid having a high viscosity is concentrated, a concentrate may be deposited and/or scorched onto a surface of the coiled condenser, and the transfer of heat may be impeded to provide a reduced efficiency of heat exchange. In addition, the transfer of heat is conducted by a natural convection, resulting in a port heat transfer efficiency. Particularly for a feed liquid having a high viscosity, it may be partially overheated, resulting in a fear that the quality of a product may be degraded, and/or in a fear that the concentrate may be scorched.

In this way, because the vacuum evaporator is provided within the heating coiled heater, there is an increased amount of entrainment, thereby providing a reduced yield of a product, and particularly, for a feed liquid liable to produce bubbles, the boiling thereof and the like is liable to be caused, resulting in a reduced quality of a product due to an uneven heating and in a significantly reduced yield due to a run-off of the feed liquid.

Further, the condenser of the heat pump is used as the heating source, but the latent heat of evaporation of chlorofluorocarbon usually used as a heat transfer medium is relatively low (e.g., the latent heat of evaporation of Freon TM 22 (chlorodifluoro methane) at 35° C. is 41 kcal/kg, and the latent heat of evaporation of water is 577 kcal/kg) and hence, the throughput of the feed liquid per unit time can be less increased.

Yet further, the known vacuum concentrating plant suffers from following problems: Because it employs a vacuum generating system using an ejector, the degree of vacuum is unstable due to a variation in temperature of circulated cooling water, thereby bringing about a variability in quality, and/or because the condensed water is used, the entrainment contaminates the circulated water and the ejector pump, thereby causing troubles or failures of them.

SUMMARY OF THE INVENTION

Accordingly, it is an object of the present invention to provide a vacuum concentrating plant in which the above disadvantages and problems associated with the prior art vacuum concentrating plants are overcome, and which is usable at a heating temperature of 60° C. or less, which exhibits a high heating efficiency and need not use steam or cooling water, which is excellent in stability and operatability and moreover, which provides a high quality of a product, a high yield and a high throughput per unit time.

To achieve the above object, according to the present invention, there is provided a vacuum concentrating plant comprising a heat pump arranged to be switched over between a heating cycle and a refrigerating cycle, a depressurized vapor generator for generating depressurized vapor of a liquid heat-transfer medium under a reduced pressure by an indirect heat exchange with a heating source in the refrigerating cycle of the heat pump, and a vacuum pan evaporator which comprises a steam jacket for indirectly heating a feed liquid by a latent heat by receiving the depressurized vapor generated in the depressurized vapor generator, a feed water concentrating zone for boiling and concentrating the feed liquid at a low temperature under a reduced pressure by a transfer of heat from the steam jacket, and a vapor condenser for cooling and condensing the vapor generated in the feed liquid concentrating zone by an indirect heat exchange with a cooling source in the refrigerating cycle of the heat pump during the start-up of the plant.

In addition to the above-described construction, an agitator may be provided for agitating the feed liquid within the vacuum pan evaporator and scraping a concentrate deposited on a wall of the evaporator. Thus, the feed liquid can be supplied through the feed liquid supply line and via on-off valve into the vacuum evaporator, and a concentrate can be withdrawn from the bottom of the vacuum evaporator via a concentrate withdrawing line having an on-off valve therein.

In starting-up the vacuum concentrating plant, it is necessary to first lower the temperature of the liquid heat transfer medium supplied into the depressurized vapor generator to a level lower than an operating temperature. For this purpose, a liquid heat-transfer medium temperature adjusting mechanism may be provided for adjusting the temperature of the liquid heat-transfer medium introduced into the depressurized vapor generator to a set value by an indirect heat exchange with the heating source in the heating cycle of the heat pump.

In this case, the liquid heat-transfer medium temperature adjusting mechanism is not mounted as a separate device within the depressurized vapor generator, but may be provided by a condenser which is designed to serve as the heating source in the refrigerating cycle of the heat pump and to be also used as an evaporator serving as a cooling source in the heating cycle by switching-over a pipe line of the heat pump, thereby exhibiting a temperature adjusting function.

With the above construction, the liquid heat transfer medium is heated by the heating source in the refrigerating cycle of the heat pump within the depressurized vapor generator to generate depressurized vapor. This depressurized vapor is introduced into the steam jacket in the vacuum pan evaporator to indirectly heat the feed liquid within the vacuum evaporator. Thus, the feed liquid within the vacuum evaporator is boiled and concentrated at a low temperature under a reduced pressure. During this time, the agitator provided within the vacuum evaporator causes the feed liquid to be agitated, while at the same time, causing a concentrate deposited on the wall of the evaporator to be scraped. The vapor generated from the feed liquid by the boiling thereof at the low temperature is condensed by the heat exchange with the cooling source in the refrigerating cycle of the heat pump in the vapor condenser provided in an upper portion of the vacuum evaporator, and is then removed in the form of a drain outside the circuit system.

Since the depressurized vapor is heated in the vacuum vapor generator by the heating source in the refrigerating cycle of the heat pump having a heat responsiveness, a short start-up time need only be required, and the set temperature can be easily changed. In addition, it is possible to finely adjust the heating temperature and the pressure, and it is also possible to provide a stable operation, because of a less variability in set temperature and pressure.

Further, since the feed liquid is heated by the latent heat of the depressurized vapor, the heat flow amount is far high, as compared with the prior art in which the feed liquid is directly heated by means of the condenser of the heat pump provided within the evaporator, and therefore, the feed liquid can be heated efficiently. More specifically, if latent heats of evaporation of fleon 22 used as a heat transfer medium in the heat pump and depressurized steam at 35° C. are compared with each other, usually, the former is 41 kcal/kg, and the latter is 577 kcal/kg which is ten times more than the former and therefore, in respect of the heating efficiency per unit flow rate, the system using the depressurized water vapor is 7 to 10 times more excellent, in actual values, than the prior art system.

Yet further, since the feed liquid in the vacuum evaporator is boiled and concentrated at the low temperature, it is possible to concentrate the feed liquid at any set temperature in a range of 10° to 110° C. by adjusting the degree of vacuum in the vacuum evaporator.

In addition, since the agitator for agitating the feed liquid in the vacuum evaporator and scraping the concentrate deposited on the wall of the evaporator is provided as described above, it is possible to enhance the speed of heat exchange of the feed water and to prevent the concentrate from being deposited and scorched onto the wall of the evaporator.

Further, since the vapor condenser added to the vacuum concentrator is cooled by the cooling source in the refrigerating cycle of the heat pump having a good heat responsiveness, it is possible to finely adjust the cooling temperature. Because of the less variability in set temperature, it is possible to provide a stable operation. Moreover, the set temperature can be easily changed.

Yet further, since the depressurized vapor for heating the feed liquid is used in the closed circuit system, there is no need for supplementing water during operation. In addition, any other cooling water or the like for the condenser is not used at all and hence, the amount of water consumed is extremely small. Any energy other than an electric power for the operation of the plant is not used at all and hence, the use and management of the system are extremely easy.

Yet further, since the heat exchange zone for heating the feed water is located in a vapor atmosphere within the vacuum vapor generator, it is less corroded, leading to a reduced cost of maintenance.

The above and other objects, features and advantages of the invention will become apparent for a consideration of the following description of the preferred embodiment taken in conjunction with the accompanying drawings.

DESCRIPTION OF THE PREFERRED EMBODIMENT

The present invention will now be described by way of a preferred embodiment in connection with the accompanying drawings.

Figure 1:
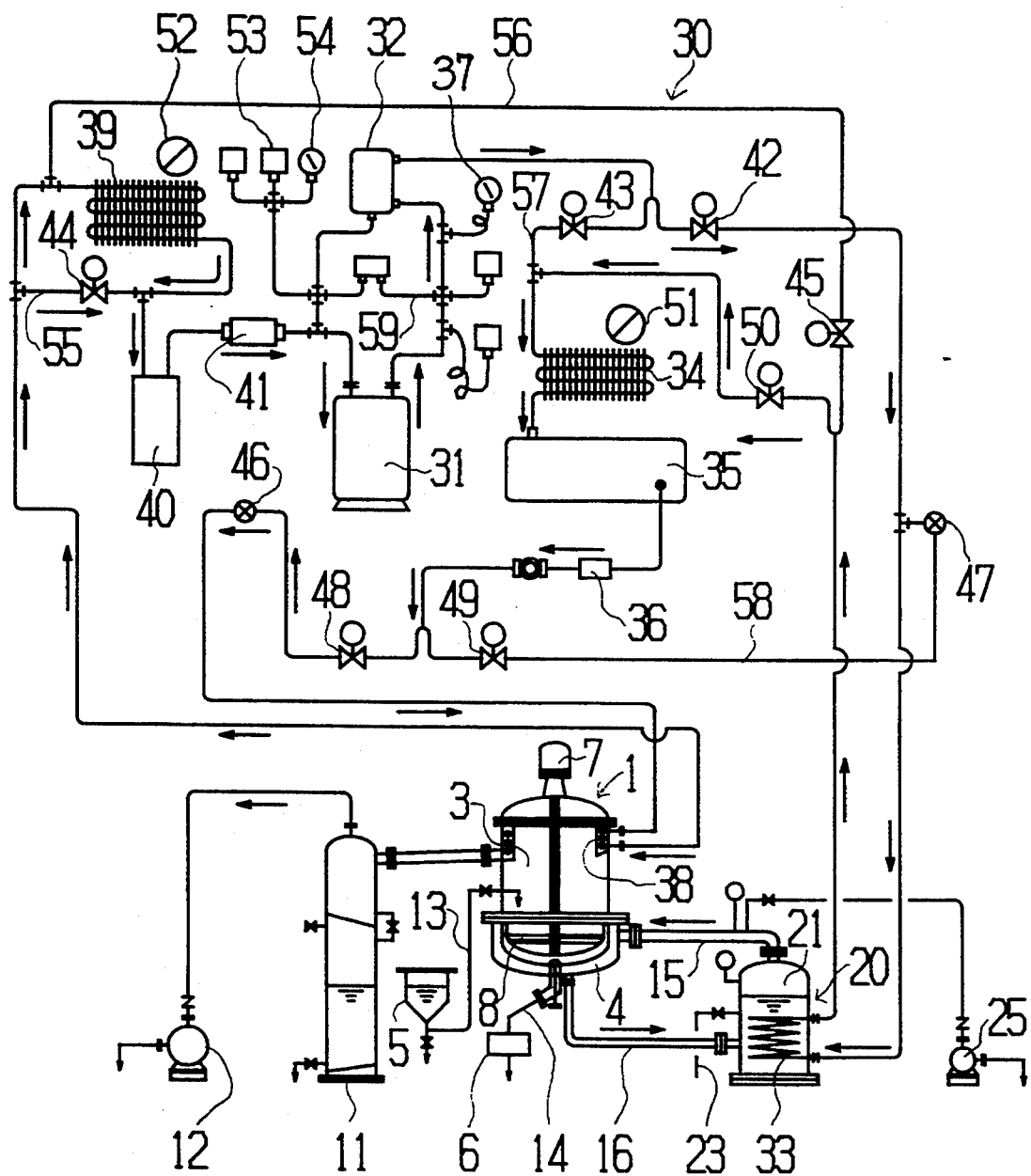
FIG. 1 is a diagrammatic illustration of a vacuum concentrating plant according to a preferred embodiment of the present invention.
Figure 2:
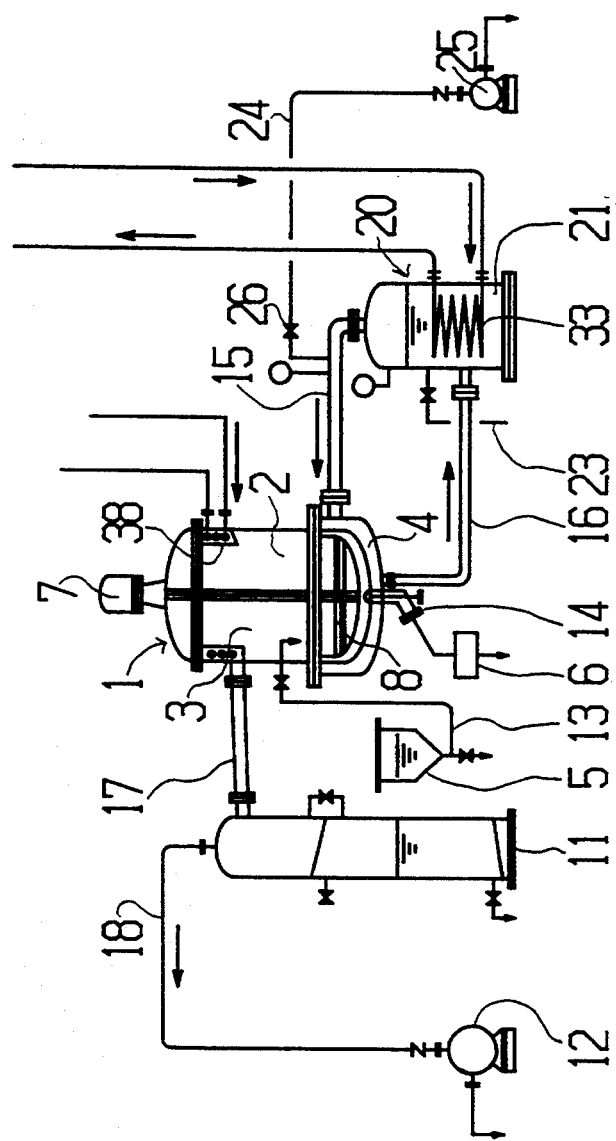
FIG. 2 is a partially enlarged illustration of the plant shown in FIG. 1.

Referring to FIGS. 1 and 2, a vacuum concentrating plant according to the present invention comprises a vacuum pan evaporator 1, a depressurized vapor generator 20 and a heat pump 30.

The vacuum pan evaporator 1 is comprised of a closed can which includes a feed liquid concentrating zone 2 at a lower portion thereof and a vapor condenser 3 at an upper portion thereof. A steam jacket 4 is provided around the lower portion of the vacuum evaporator 1. The steam jacket 4 is adapted to heat the vacuum evaporator 1 indirectly and externally by a latent heat by introducing a depressurized vapor generated in the depressurized vapor generator 20 through a depressurized vapor feed pipe 15 into the steam jacket 4.

The depressurized vapor in the steam jacket 4 condensed by heating the vacuum evaporator 1 is passed in the form of a drain through a drain pipe 16 back to the depressurized vapor generator 20.

An agitator 8 is rotated by the operation of a motor 7 for agitating the feed liquid in the vacuum concentrating zone 2 to provide a uniform heating thereof and to scrape a concentrate deposited onto an evaporator wall. A feed liquid supply tank 5 is provided to supply the feed liquid through a feed-liquid supply line 13 having an on-off valve into the vacuum evaporator 1. A receiving tank 6 receives a liquid concentrate withdrawn from a bottom of the vacuum evaporator 1 through a liquid concentrate withdrawing pipe 14. A drain tank 11 receives a condensate resulting from condensation in a vapor condenser 3 and fed through a line 17. A vacuum pump 12 is used to evacuate the vacuum evaporator 1 through lines 17 and 18.

The depressurized vapor generator 20 is comprised of a closed can having a depressurized vapor generating zone 21 therein. The depressurized vapor generator 20 includes a water feed pipe 23 provided at a lower portion thereof for supplying water as a liquid heat transfer medium, and a depressurized vapor feed pipe 15 provided at an upper portion thereof for supplying a depressurized vapor generated in the depressurized vapor generating zone 21 into the steam jacket 4 of the vacuum evaporator 1. A pressure adjusting vacuum pump 25 is in communication with the depressurized vapor generator 20 through a line 24. A pressure gate valve 26 is provided in the middle of the line 24 and adapted to be automatically closed, when the pressure in the depressurized vapor generator 20 becomes equal to a preset value.

A heat pump 30 provides a refrigerating cycle during a concentrating operation thereof in a closed circuit comprising a compressor 31, an oil separator 32, a discharge gas solenoid valve 42, a heat exchange coil 33, a liquid solenoid valve 50, a subsidiary condenser 34, a receiver tank 35, a filter drier 36, a liquid solenoid valve 48, an expansion valve 46, a heat exchanger 38 for the vapor condenser, a subsidiary evaporator 39, an accumulator 40, a filter 41 and the compressor 31.

A blower 51 is provided for blowing air to the subsidiary condenser 34 and is controllable in an on-off manner by the pressure (or temperature within a circuit system to maintain the pressure in a discharge area constant. Further provided components include a blower 52 for the subsidiary evaporator 39, a discharge gas solenoid valve 43 provided in a bypass line 57, a solenoid valve 44 provided in a bypass line 55, an intake gas solenoid valve 45 provided in a bypass line 56, an expansion valve 47 and a liquid solenoid valve 49 provided in a bypass line 58, a pressure gauge 37 at the discharge area, a pressure switch 53, a pressure gauge 54 at an intake area, and a bypass line 59. Fleon 22 is used as a refrigerant.

The operation of the vacuum concentrating plant arranged in the above manner will be described below.

Adjustment of Pressure in Vacuum Vapor Generator Upon Start-up

First, the refrigerant circuit of the heat pump 30 is operated in a heating cycle. For this purpose, the discharge gas solenoid valve 43, the intake gas solenoid valve 45, the liquid solenoid valve 49 and the blower 51 are turned ON to provide a closed circuit comprising the compressor 31, the oil separator 32, the discharge gas solenoid valve 43, the subsidiary condenser 34, the receiver tank 35, the filter drier 36, the liquid solenoid valve 49, the expansion valve 47, the heat exchange coil 33, the intake gas solenoid valve, the subsidiary condenser 39 (commonly used as the subsidiary evaporator 39 in a refrigerating circuit), the accumulator 40, the filter 41 and the compressor 31.

Then, the discharge gas solenoid valve 43, the intake gas solenoid valve 45 and the liquid solenoid valve 49 are turned ON. The blower 52 for the subsidiary condenser 39 is controlled in an on-off manner, thereby cooling the heat exchange coil 33 within the depressurized vapor generator 20 to lower the temperature of water in the depressurized vapor generating zone 21, and the pressure in a heat exchange zone 22 is adjusted by the pressure adjusting vacuum pump 25 to provide a temperature required for the concentration.

Concentrating Operation

At a time point when the pressure within the depressurized vapor generator 20 has reached a predetermined value, the refrigerant circuit of the heat pump 30 is switched into the refrigerating cycle.

For this purpose, the discharge gas solenoid valve 42 and the liquid solenoid valves 48 and 50 are turned ON, and the blower 52 for the subsidiary condenser 39 and the intake gas solenoid valve 44 are operated and controlled in the on-off manner at the pressure and temperature within the system, thereby heating the heat exchange coil within the depressurized vapor generator 20 to heat and boil the water in the depressurized vapor generating zone at a lower temperature, thus generating a depressurized vapor.

The degree of vacuum within the vacuum pan evaporator 1 is set at a predetermined value by means of the vacuum pump 12 and then, a feed liquid is supplied from the feed liquid supply tank 5 through the feed liquid supply line 13 into the vacuum evaporator 1. The depressurized vapor supplied from the depressurized vapor generator 20 through the depressurized vapor supply pipe 15 is introduced into the steam jacket 4 to indirectly heat the feed liquid within the vacuum evaporator 1 by a latent heat. The feed liquid within the feed liquid concentrating zone 2 is boiled at a low temperature depending upon the degree of vacuum within the vacuum evaporator 1, so that it is concentrated by evaporation of water. The generated vapor is cooled indirectly in the vapor condenser 3 by means of the heat exchanger 38 supplied with the refrigerant in the heat pump 30. The cooled and condensed water is passed through the line 17 into the drain tank 11 and stored therein or discharged through the on-off valve to the outside of the circuit system.

On the other hand, the depressurized vapor used in the steam jacket 4 to indirectly heat the feed water within the vacuum evaporator 1 by the latent heat is condensed and passed in the form of a drain through the drain pipe 16 back to the depressurized vapor generator 20.

A concentrator as a product is withdrawn into the concentrate receiving tank 6 via the concentrate withdrawing line 14 which is in communication with the bottom of the vacuum evaporator 1.

Operation Example

First, the heat pump 30 is switched into and started in the heating cycle to cool water in the depressurized vapor generator 20 to a temperature of approximately 30° C. Then, the vacuum pump 25 is started to adjust the pressure within the depressurized vapor generator 20 to a 40 Torrs, and the pressure adjusting valve 26 is closed. Subsequently, the heat pump 30 is switched into the refrigerating cycle to heat the water in the depressurized vapor generating zone 21 by means of the heat exchange coil 33. This heating generates depressurized vapor having a temperature of about 45° C.

On the other hand, the pressure within the vacuum evaporator 1 is set at 10 Torrs by the operation of the vacuum pump 12. When the pressure within the vacuum evaporator 1 has reached a predetermined pressure, the feed liquid is supplied from the feed liquid supply tank 5 into the vacuum evaporator 1. The depressurized vapor is fed into the steam jacket 4, and the concentrating operation is started.

Operating conditions and a result of the operation are as follows:

| | |
|---|---|
| Inlet temperature of feed Liquid: (within the feed liquid supply line 13) | 15° C. |
| Heating temperature for feed liquid: (within the steam jacket 4) | 34° C. |
| Evaporating temperature: (within the vacuun evaporator 1) | 15° C. |
| Degree of vacuum in operation: (within the vacuum evaporator 1) | 10–14 Torrs |
| Temperature of heating source: (heat exchange coil 33) | about 45° C. |
| Feed liquid to be processed: | Naturally occurring coloring matter |
| Composition of feed liquid: | containing 98.5% by weight of water |
| Throughput of feed liquid: | 15 kg/hr. |
| Output of product: | 0.45 kg/hr. |
| Composition of product: | containing 50.5% by weight of water |
| Amount of water evaporated: | 15.55 kg/hr. |
| Color tone of product: | not changed |
| Result of analysis: | not changed in quality of material |

For comparison, the following is an actual result provided by the prior art vacuum concentrating plant using the heating by warm water.

| | |
|---|---|
| Feed liquid to be processed: | Naturally occurring coloring matter |
| Composition of feed liquid: | containing 98.5% by weight of water |
| Throughput of feed liquid: | 9.8 kg/hr. |
| Output of product: | 0.29 kg/hr. |
| Composition of product: | containing 50% by weight of water |
| Amount of water evaporated: | 9.51 kg/hr. |
| Color tone of product: | slightly inferior |
| Result of analysis: | a change in quality of material was observed |

As can be seen from this result, with the plant according to the present invention, the heating temperature is constant, and the throughput per unit time is larger, i.e., the processing time is shorter. Therefore, when a material sensitive to a heat is to be concentrated, the quality of the material is less changed due to the heat, and the quality of the resulting product is remarkably superior, as compared with that produced by the prior art plant.

Although the embodiment of the present invention has been described in detail, it will be understood that the present invention is not limited to the above-described embodiment, but various modifications and variations may be made without departing from the spirit and scope of the present invention defined in claims.

What is claimed is:

1. A vacuum concentrating plant comprising
a heat pump arranged to be switched over between a heating cycle and a refrigerating cycle,
a depressurized vapor generator for generating depressurized vapor of a liquid heat-transfer medium under a reduced pressure by an indirect heat exchange with a heating source in the refrigerating cycle of said heat pump, and
a vacuum pan evaporator, which comprises a steam jacket for indirectly heating a feed liquid by a latent heat by receiving the depressurized vapor generated in said depressurized vapor generator, a feed water concentrating zone for boiling and concentrating the feed liquid at a low temperature under a reduced pressure by a transfer of heat from said steam jacket, and a vapor condenser for cooling and condensing the vapor generated in said feed liquid concentrating zone by an indirect heat exchange with a cooling source in the refrigerating cycle of said heat pump.

2. A vacuum concentrating plant according to claim 1, further including an agitator for agitating the feed liquid within said vacuum pan evaporator and also scraping a concentrate deposited on a wall of said evaporator.

3. A vacuum concentrating plant according to claim 1, further including a liquid heat-transfer medium temperature adjusting mechanism for adjusting the temperature of the liquid heat-transfer medium introduced into the depressurized vapor generator to a set value by an indirect heat exchange with the heating source in the heating cycle of the heat pump during the start-up of the plant.

* * * * *